April 26, 1927.
P. DURAND
1,625,799
AUTOMATIC WEIGHING MACHINE
Filed June 9, 1923
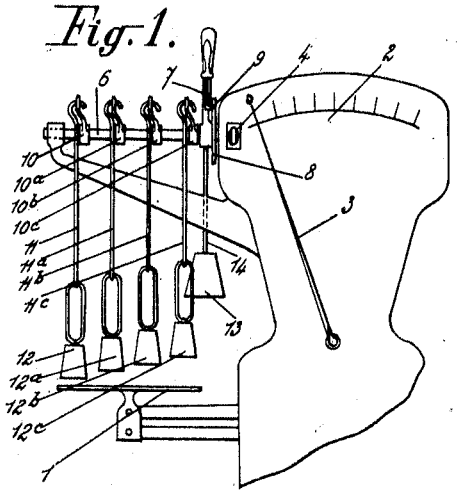
Fig. 1.
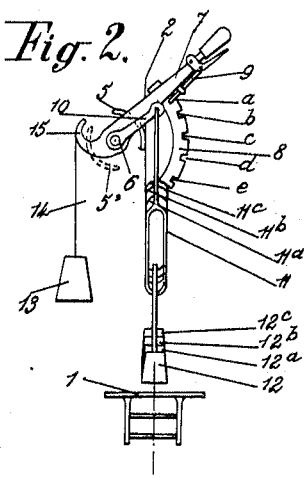
Fig. 2.
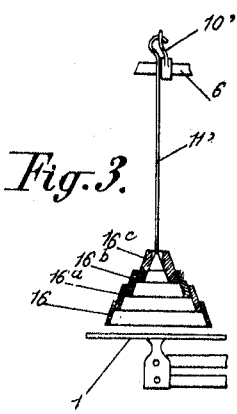
Fig. 3.
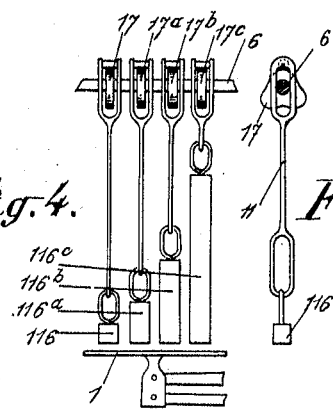
Fig. 4.   Fig. 4ᵃ.
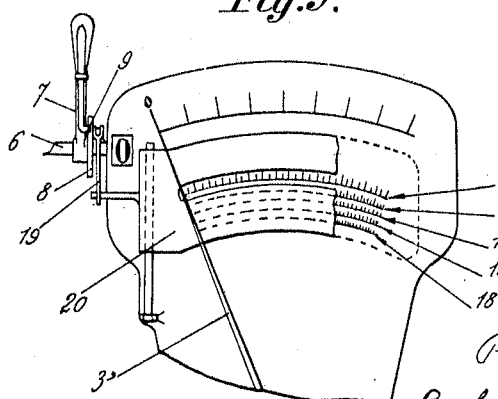
Fig. 5.
Paul Durand
By his Attorney
H S MacKay Patented Apr. 26, 1927.

1,625,799

UNITED STATES PATENT OFFICE.

PAUL DURAND, OF PARIS, FRANCE.

AUTOMATIC WEIGHING MACHINE.

Application filed June 9, 1923, Serial No. 644,305, and in France May 1, 1923.

The present invention relates to an improvement in weighing scales of the type in which the various unitary weights are deposited at will upon the scale pan by means of a lever operated by hand and connected with an indicator which shows the total unitary weight on the pan at any time.

It is obvious that, in proportion as the total unitary weights on the pan increases, the graduations on the fractional scale employed in the usual manner with a swinging dial must be brought nearer together. Accordingly one object of the present invention is to provide means whereby a new fractional scale is brought into operation automatically with each increase or decrease in the total unitary weight on the pan.

Another object which can be attained by use of this invention is the automatic substitution of different indicating graduations corresponding to different total unitary weights on the pan.

For these purposes, then I employ a plurality of separate graduations corresponding to the different unitary totals, and I supply a mask or cover which moves with the weight-depositing means, so as to make visible at any time only that row of graduations that is appropriate to the corresponding unitary total.

The invention is illustrated in a preferred form in the accompanying drawings, wherein Figure 1 is a front elevation of a weight depositing means on a weighing scale, Figure 2 is a side elevation of the same, Figure 3 is a view partly in section illustrating a modified form of weight depositing means, Figure 4 is a front elevation and Figure 4ᵃ a side elevation of another modified form, and Figure 5 is a front view of my invention as applied in connection with any one of these forms or their equivalents.

In Figs. 1 and 2 the usual tray 1 is provided upon which the supplementary weight units are deposited, 2 represents the graduation on which the fractional weights are indicated by the pointer or hand 3 (shown in its zero position). 4 is an aperture in the dial plate, through which the indicator, shown in the drawing by way of example, in the form of a cylindrical quadrant 5, exhibits a numeral which corresponds to the number of weight units deposited on and actuating the tray 1 of the balance. In the position illustrated in the drawings (Figs. 1 and 2) none of the weights is deposited on the tray 1, the indicator therefore shows the numeral zero. The quadrant 5 is rigidly mounted on the shaft 6 which also carries, keyed to it the lever 7 adapted to be manually operated and to be locked by means of the spring catch or bolt 9 in any one of the positions determined by the notches a, b, c, d, e provided on the stationary quadrant 8, each of these positions corresponding to the number of weight units deposited on the tray 1. The shaft 6 further carries rigidly mounted levers 10, 10ᵃ, 10ᵇ, 10ᶜ, having pivotally connected to their outer ends the rods 11, 11ᵃ, 11ᵇ, 11ᶜ, each ending in an elongated loop from which are suspended the weights by means of elongated rings rigidly attached thereto in such a manner that the inter-engaging loops of the rods 11, 11ᵃ, 11ᵇ, 11ᶜ may freely move in relation to the rings of the weights 12, 12ᵃ, 12ᵇ, 12ᶜ, respectively without being in contact therewith when the weights are deposited on the tray 1. The length of the rods 11, 11ᵃ, 11ᵇ, 11ᶜ, with their loops as well as the length of the rings of the weights is so determined that, when, for example, lever 7 is in position a none of the weights reposes on the tray 1, no matter what the position of the latter in a vertical plane may be. In this position, therefore, the indicator will show the numeral zero. When the lever 7 is moved into position b the weight 12 is deposited on the tray 1 and the loop of rod 11 is out of contact with the ring of weight 12 in whatever position of oscillation the tray may be. The weights 12ᵃ, 12ᵇ, 12ᶜ, remain suspended from their respective loops and out of contact with the tray 1 while the indicator will show the numeral 1. When lever 7 is brought into position c the weight 12ᵃ will be deposited on the tray in addition to the weight 12 in an analogous manner, the weights 12ᵇ and 12ᶜ remain suspended clear of the tray and the indicator will show the numeral 2. It will be readily understood that in moving the lever 7 into the positions d and e the weights 12ᵇ and 12ᶜ will successively be added to the weights on the tray so that correspondingly the numerals 3 and 4 will be exhibited by the indicator.

In order to counteract the effort required for operating the lever 7, a counterweight, such as for instance 13 may be suspended by means of a cable or tape 14 or the like from a cam 15 formed integrally with the lever 7 and is of such configuration as will ensure that in each of the positions $a$, $b$, $c$, $d$, $e$, the aggregate of such of the weights 12, $12^a$, $12^b$, $12^c$, which remain suspended is counterbalanced by the weight 13.

In Fig. 2 a second indicator quadrant $5^1$ is shown in dotted lines diametrically opposite to quadrant 5 on shaft 6, in such a way that the indications of the latter quadrant are repeated on the opposite side of the machine. This arrangement is intended for machines in which the pointer 3 is duplicated so as to indicate also to the buyer, who usually is on that side, the weight indicated to the salesman.

Fig. 3 shows a modification in which the shaft 6—instead of carrying four levers each controlling a separate weight—carries a single lever 10′ having pivotally connected to it a rod 11′ which, in accordance with the position of the control lever, successively operates one of a nest of weights 16, $16^a$, $16^b$, $16^c$, which are arranged one in and supporting the other, so that for each position of the control lever a corresponding number of weights are deposited on the tray 1, clear of the remaining weights or of the supporting rod 11′.

Figs. 4 and $4^a$ show another modification in which the shaft 6—instead of operating the weights (116 to $116^c$) by means of levers—actuates them by means of cams 17, $17^a$, $17^b$, $17^c$, in such a way that any combination in the selection of the weights to be deposited is possible.

Fig. 5 shows the dial of a weighing machine in which the pointer 3′ indicates on a series of graduations the cost of the article at a given unit price. Assuming the machine to be of the same capacity as the machine shown in Figs. 1 and 2 a series of five cost graduations is marked on the dial. The graduation 18 gives the cost for fractional weights only, that is when no weight is on the tray, while the graduations $18^a$, $18^b$, $18^c$, $18^d$, give the cost when one, two, three or four weights respectively have been deposited on the tray.

These graduations may be varied in known manner to correspond with varying unit prices.

In this example the lever 7 by means of which the weights are controlled in the manner hereinbefore described is connected by means of a link 19 to a cover plate 20 which is suitably guided so as to be capable of vertical movements. The cover plate 20 (shown partly broken away) is provided with an arc shaped slot, so that in every position of the lever 7 only the one graduation is exposed to view which corresponds to the weight deposited on the tray. In this way errors of reading, which may be caused by confusion arising from the sight of several graduations, is obviated, because at any moment only the correct graduation is visible.

The method of graduation shown in Fig. 5 for indicating the cost of the article, may equally well be adapted for recording weight in place of the numeral indicator shown in Figs. 1 and 2.

It will be understood that the constructions illustrated in the drawings and herein described are given as examples only and are susceptible of many variations, without thereby constituting departures from the principle of the invention.

What I claim and desire to protect by Letters Patent is:—

In weighing scales, weight depositing means and an indicator of the totals of weights deposited operated thereby; in combination with a plurality of stationary rows of graduations one above the other separate from the aforesaid indicator and corresponding respectively to the different unitary totals, masking means for said rows, means operatively connected with the weight depositing means for automatically moving the masking means up and down in front of said rows of graduations, and a movable pointer adapted to be swung in front of said graduations by operation of the weighing device.

In testimony whereof I affix my signature.

PAUL DURAND.